Nov. 13, 1956    J. MÖLLERS    2,770,025
DEVICE FOR THE MANUFACTURE OF CERAMIC MOULDINGS
Filed April 26, 1952
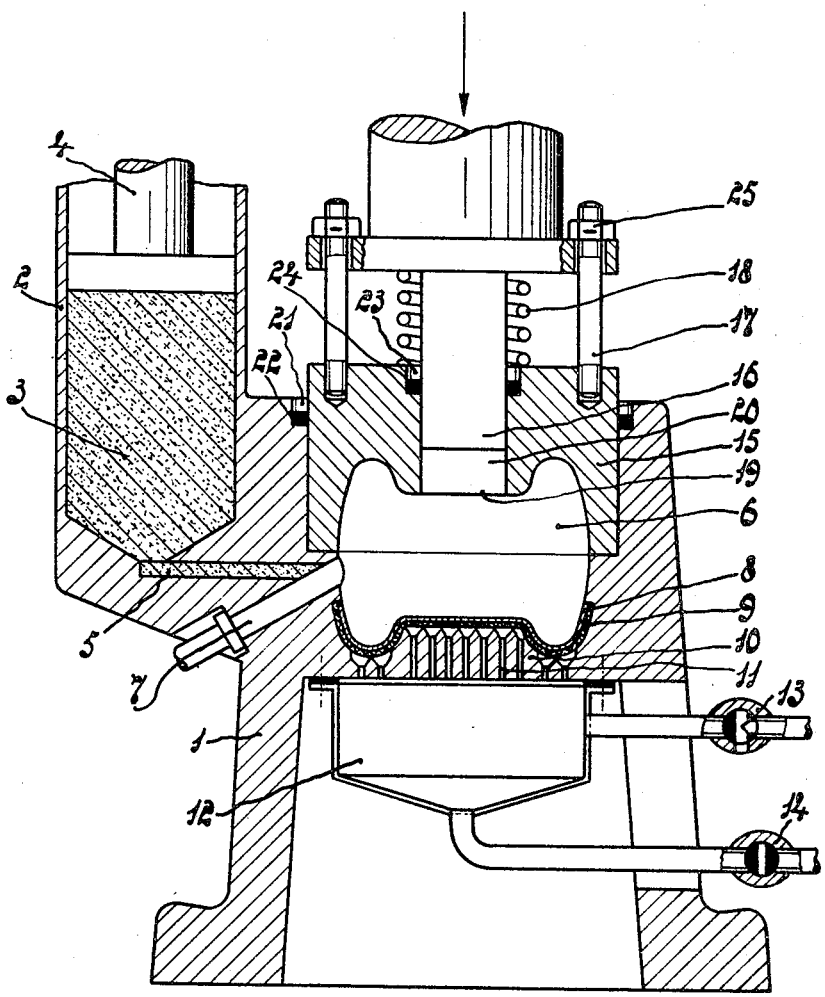
INVENTOR
Josef Möllers
BY Fred M. Vogel
AGENT United States Patent Office 2,770,025
Patented Nov. 13, 1956

2,770,025

DEVICE FOR THE MANUFACTURE OF CERAMIC MOULDINGS

Josef Möllers, Hamburg-Poppenbuttel, Germany, assignor to Hartford National Bank and Trust Company, Hartford, Conn., as trustee Application April 26, 1952, Serial No. 284,625

Claims priority, application Germany June 9, 1951

4 Claims. (Cl. 25—27)

When manufacturing ceramic mouldings the components of the material are generally first crushed and mixed in a ball mill in the required mutual ratio, together with the flux that may be required, with the admixture of water. The water is then largely removed in a filter press. The filter cake thus left is then shaped, by cutting up and kneading, into the form from which it is further worked up, for example by means of a vacuum extrusion press, by moulding on a potter's disc or, subsequent to preliminary calcination, by turning on the lathe or, subsequent to renewed admixture of water, by moulding in a plaster mould.

It has been found that the resistance of ceramic material to breakdown in the presence of high-electric voltages largely depends on the quantity of the residual gases contained in the material, particularly of the occluded air. The greater the content of air, the more the resistance to breakdown is decreased, since the ionisation which precedes sparking is readily apt to be initiated in occluded air pockets and thus assists in breakdown.

It has been found that compared with all the other stages of completion the material has the lowest air content (only about 0.5% by volume) subsequent to treatment in the filter press, and hence in the filter cake, so that it is advantageous to include as few as possible working stages between filter cake and final shaping.

For the manufacture of ceramic moulding in which the starting materials are mixed (suspended) with the admixture of a liquid, the liquid being then removed wholly or in part, the process may be shortened to a marked extent and thus result in a considerable decrease in cost if, according to the invention, the liquid is removed from the material to be moulded by the use of a filter press the inner space of which constitutes a die. The mouldings extracted from the press require little finishing and may be sintered or fired without any further intermediate treatment.

The liquid-transmitting part of the die wall is preferably opened out into a vacuum-tight receptacle for the liquid removed from the suspended material. The receptacle and the die are evacuated prior to introduction of the material so as to prevent the suspended material from absorbing air during introduction into the die cavity or air pockets from being formed at any point, since otherwise the die cavity would not be filled entirely with material.

The liquid expelled from the receptacle is collected in a container and is used with advantage when mixing the starting material for one of the subsequent moulding operations. This permits the use for mixing and suspending of liquids other than water having the advantage of dissolving components of the mixture, for example BaO or MgO, to a less extent or having a lower viscosity or a higher volatility, such, for example, as alcohol, acetone, ether, or the like. Since the use of such other liquids results in the components of the mixture not being dissolved or not reacting chemically with the liquid, the liquid in the filter press is more readily removed, particularly if use is made of a vacuum, so that the mouldings extracted from the press have a lower content in moisture than could be obtained hitherto.

By enabling kneading or pressing of the moulding extracted from the die to be omitted, the use of a filter press according to the invention obviates the need for adding particular plastifying agents, such, for example, as clay or methylcellulose, which often adversely affect the electric properties. This enables non-plastic materials, such, for example, as titanates, particularly also pure $TiO_2$, to be assembled in a simple mixing device with the admixture of liquid and to be moulded by means of the filter press according to the invention.

Ceramic mouldings made with the use of a filter press according to the invention are greatly free from air but also more homogeneous than material obtained by the methods hitherto in use, for example from a vacuum extrusion-press in which the extrusion is effected by spiral advance.

In order that the invention may be clearly understood and readily carried into effect, it will now be described in detail with reference to the accompanying drawing, in which one embodiment of a filter press according to the invention is shown, by way of example, diagrammatically and in central longitudinal view.

A pedestal 1 laterally supports a container 2 in which a mixture 3 can be set under pressure by a piston 4. The container 2 is connected to a die cavity 6 by a supply pipe 5 whose entry port to the die space 6 can be obturated in a vacuum-tight manner by means of a stud 7 which acts as a valve.

At the bottom the die space 6 is limited by a filter cloth 8 which is located on a wire gauze 9. The wall 10 contains channels 11 which are slightly widened at the inlet end. The passage of liquids and gases through the wall 10 is enabled by the said channels 11 and solid components are arrested on the filter cloth 8. The channels 11 open into a receptacle 12 which is adapted to be connected to a vacuum pump (not shown) via a pipe containing a three-way cock 13. At the funnel-shaped narrowed bottom of the space 12 the liquid collected can be drained through a pipe having a valve 14 into a container (not shown), for example a glass bulb.

At the top of the die provision is made of a ring piston 15 which by means of a packing 22 held by an adjusting ring 21 fits in the pedestal 1 in a vacuum-tight manner. At the centre of the ring piston 15 provision is made of a plunger 16 by which the moulding operation proper is effected. In the position shown a cavity 20 separates the die space 6 from the plunger 16. The ring piston 15 and the plunger 16 are guided concentrically by guide bolts 17 provided with nuts 25. By means of a spring 18 a sealing pressure is transmitted from plunger 16 to the piston 15. At the top of the ring piston 15 a packing 24 is held by an adjusting ring 23.

The manufacture of a ceramic moulding by means of the filter press shown is effected as follows.

Initially, the plunger 16 and the ring piston 15 occupy the position shown in the drawing, the valves 7, 13 and 14 being closed.

The valve 13 is then opened, the receptacle and also the die space 6 and the cavity 20 being evacuated by means of a pump (not shown). Next, the supply pipe 5 is released by the stud valve 7, the mixture flowing into the die and also filling the space 20 below the plunger 16. The valve 7 is then re-closed and by this time, or even a short time afterwards air can be admitted to the space 12.

The plunger 16 is then lowered with the result that the material from the space 20 is forced into the die 6 and the liquid is pressed through the filter cloth 8, the wire gauze 9 and the channels 11 into the receptacle 12. When the cock 14 is opened the downwardly pressed liquid flows into the container not shown so as to be adapted to be re-used in the manufacture of new mixtures for subsequent moulding operations. By a proper choice of a definite mixing ratio and suitable dimensions the volume of the space 20 is enabled to be exactly as large as the volume of liquid required to be pressed down during the moulding operation. Thus, at the end of the moulding operation the bottom of the plunger 16 is in exactly the same plane as the top 19 of the completed moulding.

After termination of the moulding operation the plunger 16 rises beyond the position shown in the drawing, carrying the ring piston 15 along with it by means of the bolts 17 so as to enable the moulding to be extracted from the opened die.

As an alternative, when using a material which subsequent to moulding has sufficient consistency, the completed moulding can be extracted from the lower die part 6 by pressure below atmospheric pressure being provided in the space 20. Admission of compressed air to the space 20 by means of a compressed-air pipe (not shown) then enables the moulding to be extracted from the ring piston and to be received, for example, by hand.

The plunger 16 is then lowered together with the ring piston 15 into the starting position shown, the ring piston 15 being thus fittingly pressed into the pedestal 1 by means of the spring 18. Subsequent to the valves 13 and 14 being closed, the manufacture of a following moulding may be started.

What I claim is:

1. An apparatus for molding wet ceramic material comprising a vacuum-tight mold, means for introducing a wet batch of ceramic material into said mold, vacuum-tight valve means for controlling the introduction of ceramic material into said mold, a vacuum-tight receptacle, said mold having a plurality of channels in a wall portion thereof communicating with said receptacle, filter means disposed adjacent said channels for permitting the passage only of gases or liquids, means connected to said receptacle for evacuating said receptacle and said mold, and means for applying pressure to said wet batch of ceramic material to simultaneously press out the liquid therefrom and shape said material.

2. An apparatus for molding wet ceramic material comprising a vacuum-tight mold, means for introducing a wet batch of ceramic materials into said mold, including a container for said materials and a reciprocal piston therein, vacuum-tight valve means for controlling the introduction of ceramic material into said mold, a vacuum-tight receptacle, said mold having a plurality of channels in a wall portion thereof communicating with said receptacle, said channels having widened funnel-shaped openings terminating within the mold, filter means disposed adjacent said funnel-shaped openings for permitting the passage only of gases or liquids, means connected to said receptacle for evacuating said receptacle and said mold, and plunger means for applying pressure to said wet batch of ceramic material to simultaneously press out the liquid therefrom and shape said material.

3. An apparatus for molding wet ceramic material comprising a vacuum-tight mold, means for introducing a wet batch of ceramic material into said mold, vacuum-tight valve means for controlling the introduction of said ceramic material into said mold, a vacuum-tight receptacle, said mold having a plurality of channels in a wall portion thereof communicating with said receptacle, said channels having widened funnel-shaped openings terminating within the mold, filter means disposed adjacent said funnel-shaped openings for permitting the passage only of gases or liquids, means connected to said receptacle for evacuating said receptacle and said mold, means connected to said receptacle for withdrawing liquids therefrom, and plunger means spring biased to an inoperative position for applying pressure to said wet batch of ceramic material to simultaneously press out the liquid therefrom and shape said material.

4. An apparatus for molding wet ceramic material comprising a vacuum-tight mold, vacuum-tight means for introducing a wet batch of ceramic material into said mold, including a container for said ceramic material and a reciprocable plunger therein, vacuum-tight valve means for controlling the introduction of said ceramic material into said mold, a vacuum-tight receptacle, said mold having a plurality of channels in a wall portion thereof communicating with said receptacle, said channels having widened funnel-shaped openings terminating within the mold, filter means disposed adjacent said funnel-shaped openings for permitting the passage only of gases or liquids, means connected to said receptacle for evacuating said receptacle and said mold, vacuum-tight means connected to said receptacle for withdrawing liquids therefrom, and plunger means spring biased to an inoperative position for applying pressure to said wet batch of ceramic material to simultaneously press out the liquid therefrom and shape said material.

References Cited in the file of this patent

UNITED STATES PATENTS

| | | |
|---|---|---|
| 825,243 | Rieter-Bodmer | July 3, 1906 |
| 1,863,854 | Jeffery | June 21, 1932 |
| 2,026,940 | Hendryx | Jan. 7, 1936 |
| 2,186,331 | Flood et al. | Jan. 9, 1940 |
| 2,356,852 | Hutchinson | Aug. 29, 1944 |
| 2,422,809 | Stupakoff et al. | July 24, 1947 |
| 2,513,785 | Browne | July 4, 1950 |
| 2,517,707 | Payne | Aug. 8, 1950 |
| 2,570,257 | McFarren | Oct. 9, 1951 |
| 2,650,409 | Dubbs | Sept. 1, 1953 |